May 26, 1970 R. H. MILLER ET AL 3,513,499
WINDOW CLEANING SYSTEM
Filed Sept. 27, 1968 2 Sheets-Sheet 1
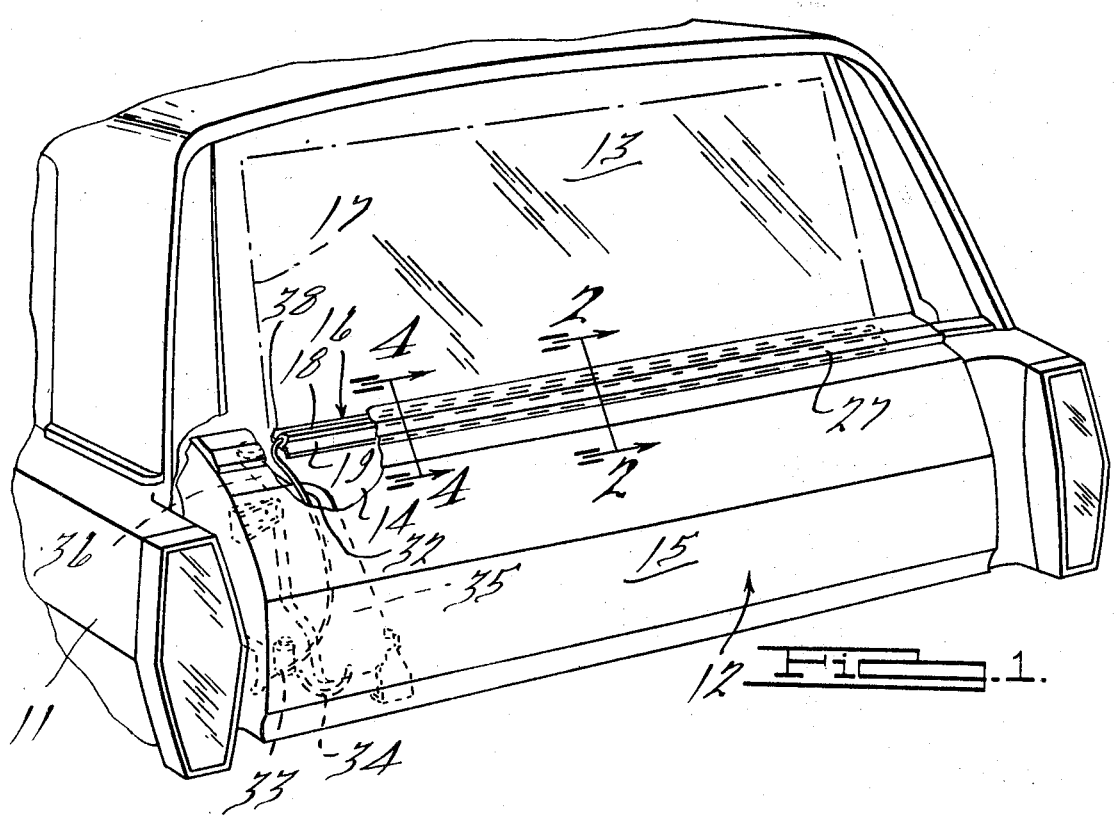
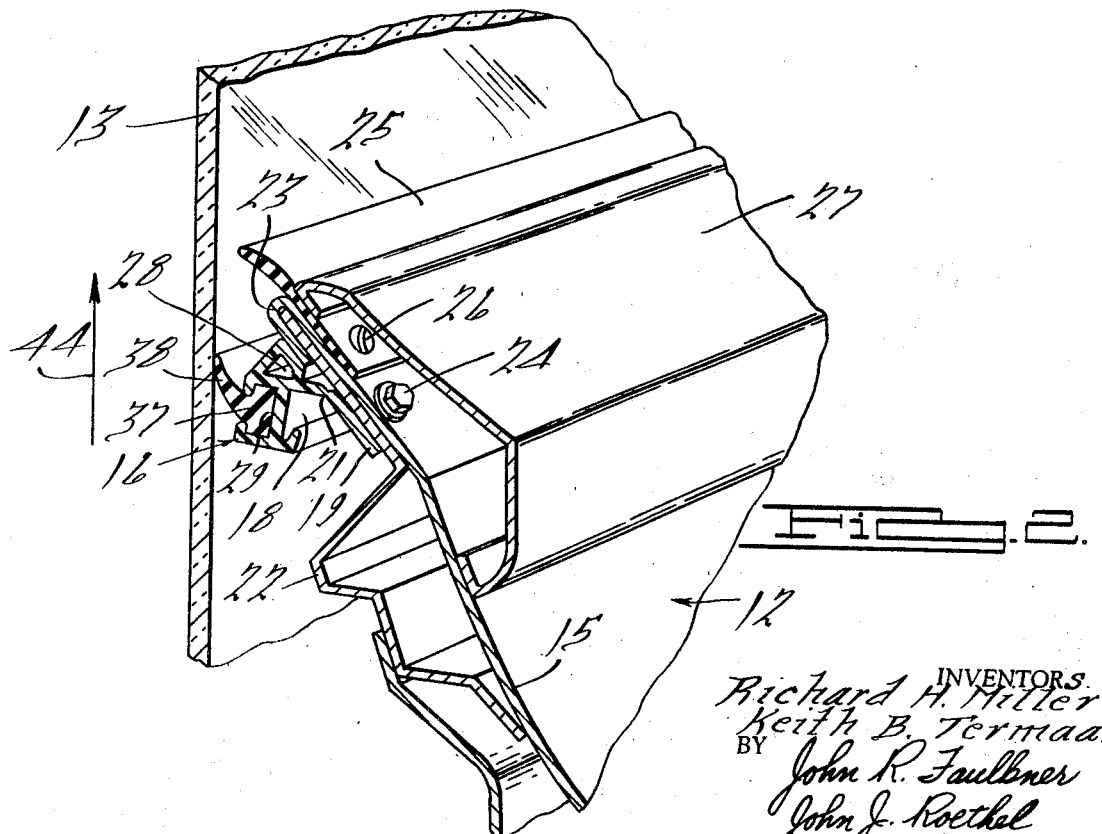
INVENTORS.
Richard H. Miller
Keith B. Termaat
BY John R. Faulkner
John J. Roethel
ATTORNEYS

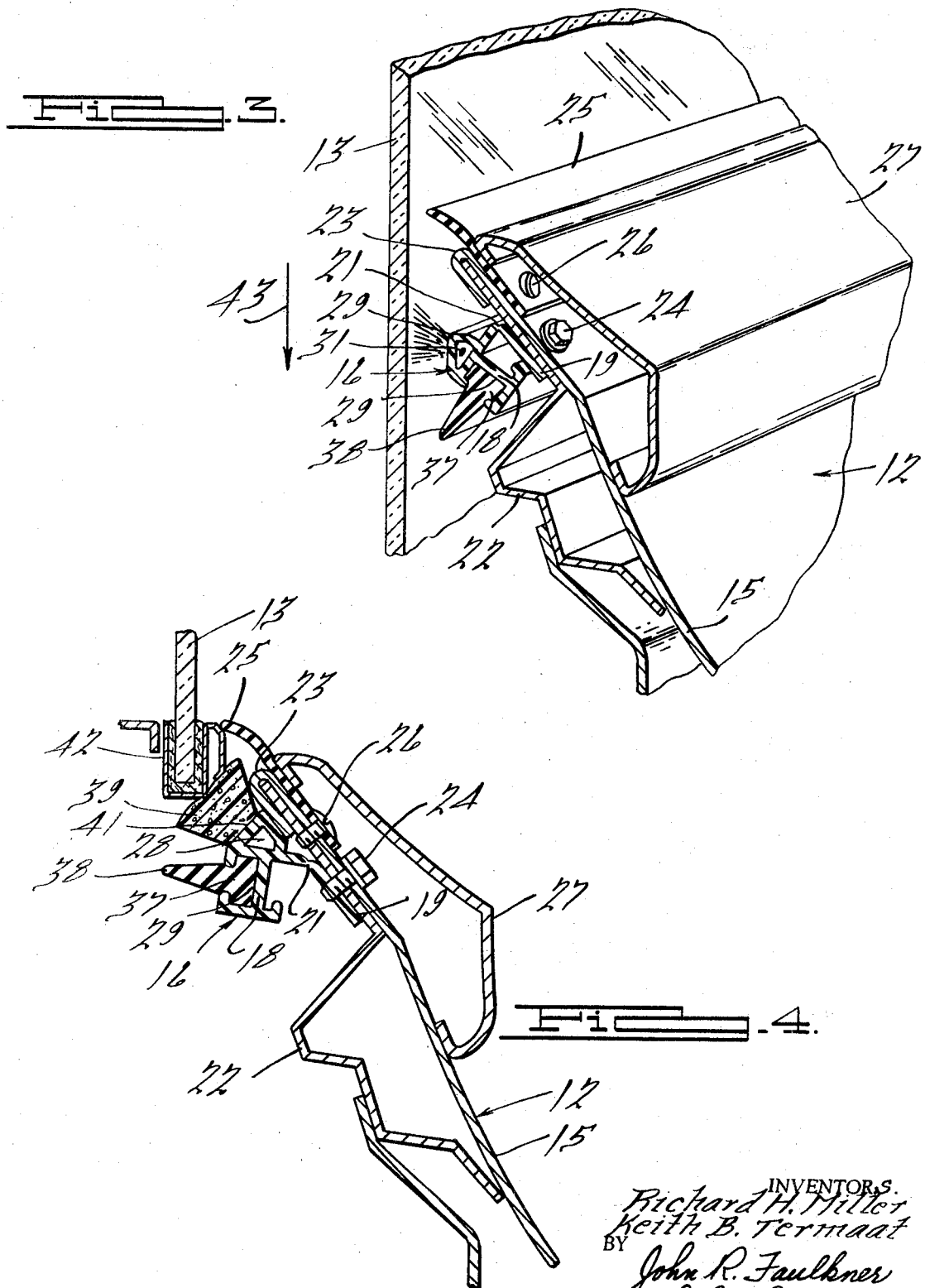

United States Patent Office 3,513,499
Patented May 26, 1970

3,513,499
WINDOW CLEANING SYSTEM
Richard H. Miller, Wayne, and Keith B. Termaat, Livonia, Mich., assignors to Ford Motor Company, Dearborn, Mich., a corporation of Delaware
Filed Sept. 27, 1968, Ser. No. 763,144
Int. Cl. B60s 1/48, 1/58
U.S. Cl. 15—250.01
7 Claims

ABSTRACT OF THE DISCLOSURE

A window cleaning unit comprising an elastomeric member extending substantially across the width of a reciprocable window. The elastomeric member has a conduit portion having a plurality of spray apertures, a channel portion carrying a wiper blade means and a flange portion for fastening the member to a window well structure. Positioning means selectively swings the conduit and blade carrying portions in response to reciprocable window movement about a hinge bend line on the flange portion to direct the spray apertures at the window surface or to position the wiper blade means in squeegee relationship to the window.

BACKGROUND OF THE INVENTION

The reciprocable rear window of one popular type of vehicle body, the station wagon, has long presented a problem with regard to the maintenance of clear vision through the window. The windshield of a vehicle can be cleaned by liquid sprayed thereon and squeegeed by the windshield wipers. The side windows in the main are protected from dust accumulation by the air stream created by the vehicle movement. The substantially vertically rear window of a station wagon, however, is in a low pressure area. Even if wind deflectors are used on the rear of the vehicle, the window has a particular affinity for collecting dirt.

It has been proposed to mount fluid spray nozzles directed toward the rear window and to provide conventional type windshield wiper blade mechanisms for removing the liquid and therefore the dirt accumulated on the window. Such an arrangement has several disadvantages. The wipe area of oscillating windshield wiper blades of the type used on the front windshields of vehicles is somewhat limited. This limited wipe pattern would be particularly noticeable on the large rear windows of the type used in station wagon tailgates. Complex controls must be incorporated in the system to insure that washer fluid is not squirted into the vehicle interior when the window is in a lowered position or that the wiper blades are not actuated when the window is in a lowered position.

Preferably, the fluid dispensing apparatus and the wiper blade and blade supporting means should be concealed from the elements and from possible damage when the tailgate is in a cargo loading or load carrying position.

It is an object of the present invention to provide a rear window washing and wiping cleaning system having its components constructed and arranged to avoid the disadvantages of known systems and to provide a concealed system.

SUMMARY OF THE INVENTION

The window cleaning system or unit embodying the present invention is particularly adapted for use with a window reciprocably movable into and out of a window well, such as a rear window mounted in the tailgate of a station wagon. The window cleaning unit comprises an elongated elastomeric member having a body section and an integrally joined flange section. The juncture between the body section and the flange section forms a hinged bend line. The flange section is mounted subjacent the upper horizontal edge of a window well. The elastomeric member body section has a conduit portion and a channel portion in superimposed relationship to each other. The conduit portion is provided with a plurality of fluid spray apertures. The channel portion of the elastomeric member body section retains and supports a wiper means in the form of a wiper blade. The elastomeric member body section is under the control of a positioning means which swings the body section about the hinge bend line to cause the spray apertures to be positioned to direct fluid on the window surface and the wiper blade to contact the window surface in predetermined sequence as the window is lowered and raised.

The conduit portion of the elastomeric member body section is adapted to be connected to a reservoir containing fluid which can be placed under pressure and directed through the spray apertures onto the window surface to be cleaned.

DESCRIPTION OF THE DRAWING

Other objects, advantages and features of the present invention can be made more apparent as this description proceeds, reference being had to the accompanying drawings, wherein:

FIG. 1 is a fragmentary perspective view of a vehicle body of the station wagon type illustrating the environment in which the present invention is to be used;

FIG. 2 is a section view on the line 2—2 of FIG. 1;

FIG. 3 is a view in part similar to FIG. 2 illustrating the parts of the window cleaning mechanism in a second position of operation; and FIG. 4 is a section view taken substantially on the line 4—4 of FIG. 1.

DETAILED DESCRIPTION OF THE INVENTION

Referring now to the drawings, and more particularly to FIG. 1, there is illustrated the rear end of a station wagon body 11 fitted with a tailgate 12 having a window 13 that may be lowered into or raised out of a window well formed by the inner and outer panels 14 and 15, respectively, of the tailgate. The mechanism for lowering and raising the window forms no part of the present invention and it will be understood that any conventional power window regulator mechanism may be used.

The window cleaning unit for cleaning the window 13 comprises an elongated elastomeric member, generally designated 16. The elastomeric member 16 is preferably an extruded polypropylene plastic and is of sufficient length to wipe the area shown by the dot and dash line 17, see FIG. 1. The elastomeric member 16 has a body section 18 and a flange section 19. Flange section 19 is creased at 21 to form a plastic hinge bend line.

The flange section 19 is mounted or secured to the underside of a structural member 22 of the tailgate subjacent the upper edge 23 of the outer panel 15. As illustrated, the securing means may be a plurality of bolts 24.

The gap between the window 13 and the upper edge 23 of the tailgate panel 15 preferably is covered by a weatherstrip 25. The weatherstrip fasteners 26 and the bolts 24 are covered by a reveal molding 27.

The elastomeric member body section 18 has a conduit portion 28 superimposed above a channel portion 29. The conduit portion 28 has a plurality of spray apertures 31 along its length. One end of the conduit portion is plugged and the other end is connected to a tube or hose 32 which is connected to the discharge side of a windshield washer fluid pump 33. The pump 33 draws fluid through a hose or tube 34 connected to the bottom of a reservoir 35 mounted within the tailgate 12 structure at one end, as shown in FIG. 1. The reservoir is refillable through a capped filler pipe 36 accessible on the inside of the tailgate.

The channel portion 29 of the elastomeric member body section 18 receives the base 37 of a wiper blade 38 which is adapted to squeegee the wetted window surface, as will be explained.

A series of friction pads 39 are mounted at intervals along the length of the outer surface 41 of the conduit portion 28. The friction pads 39 are preferably a neoprene sponge material coated with urethane and are cemented or otherwise secured to the polypropylene elastomeric member 16. As seen in FIG. 4, when the vehicle window 13 is in its uppermost position the friction pads 39 have an interference relationship with the bottom of the channel 42 encompassing the lower margin of the glass 13.

Assuming that it is desired to clean the surface of the glass, it is necessary to actuate a switch to cause the window regulator mechanism to lower the window or to move it in the direction of the arrow 43 in FIG. 3. As the window moves down, the frictional engagement of the friction pads 39 with the window surface causes the body section 18 of the elastomeric member 16 to swing about the hinge bend line 21 until the position shown in FIG. 3 is reached. In this position the wiper blade 38 is out of contact with the glass surface. Simultaneously with actuation of the switch to cause the window to be moved downwardly, either a separate switch or a switch tied into the window operating switch must then be operated to energize the pump motor to cause the pump 33 to force fluid under pressure into the conduit portion 28 of the body section 18. The electric circuitry involved would be similar to that found in conventional windshield wiper and washer systems. These have taken many forms. For example, one system in current use on some vehicle models interlocks the lever controlling the operation of the windshield washer fluid pump with the wiper blade drive motor so that when the washer is turned on the wiper blade automatically begins to oscillate back and forth across the wetted area. Upon release of the lever causing actuation of the washer fluid pump, this lever springs back to a neutral position. The wiper blade lever, however, must be manually returned to the off position in order to stop the oscillation of the windshield wiper blades. Some systems are arranged so that when the washer fluid pump switch is turned on and then released the windshield wiper blade will oscillate through a predetermined number of cycles. Any one of these systems are adaptable to the present arrangement, the important thing as far as the present invention is concerned being that fluid under pressure is supplied through the conduit portion 28 and distributed through the spray apertures 31 as the window is moved in a predetermined direction, preferably in a down direction.

When the window moves in an opposite or upward direction, the friction pads cause the body section 18 of the elastomeric member 16 to swing about the hinge bend line 21 to bring the wiper blade portion 38 into contact with the window surface, as shown in FIG. 2. The wiper blade then becomes operative to squeegee the wetted surface of the wipe area of the rear window.

It is to be understood that this invention is not limited to the exact construction illustrated or described above, but that various changes and modifications may be made without departing from the spirit and scope of the invention as defined by the appended claims.

We claim:

1. A window cleaning unit for a window reciprocably movable into and out of a window well, comprising:
   an elongated elastomeric member having a body section and an integrally joined flange section,
   the juncture between said body section and said flange section comprising a hinge bend line,
   said flange section being mounted subjacent the upper horizontal edge of a window well,
   said elastomeric member body section having a conduit portion and a channel portion in superposed relation to each other,
   the conduit portion having a plurality of fluid spray apertures and being adapted to be connected to a source of fluid under pressure,
   wiper means carried in said channel portion,
   and positioning means for swinging the body section about the hinge bend line to cause said spray apertures to direct fluid on the window surface and the wiper blade to contact the window surface in predetermined sequence as the window is lowered and raised.

2. A window cleaning unit according to claim 1, in which:
   the elastomeric member body section conduit portion is located above the channel portion,
   and the positioning means is operative to swing the body section from a position in which the spray apertures are directed toward the glass surface when the wiper means is in glass surface noncontacting position.

3. A window cleaning unit according to claim 1, in which:
   the positioning means comprises at least one friction pad secured to the conduit portion of the elastomeric member body section in abutting relation to the window surface,
   said friction pad on the down stroke of the window swinging the body section about the hinge bend line to position the wiper means out of contact with the window surface as the fluid is sprayed thereon,
   said friction pad on the upstroke of the window swinging the body section about the hinge bend line to position the wiper means in window squeegee position.

4. A window cleaning unit according to claim 1, in which:
   the elastomeric member body section conduit portion is located above the channel portion carrying the wiper means,
   and the positioning means comprises a plurality of resilient friction pads secured to the conduit portion of the elastomeric member body section in abutting relation to the window surface,
   said friction pad on the downstroke of the window causing the body section to swing about the hinge bend line to position the wiper means out of contact with the window surface as the fluid is sprayed thereon,
   said friction pad on the upstroke of the window swinging the body section about the hinge bed to position the wiper means to squeegee the window.

5. A window cleaning unit for a vehicle window reciprocably movable into and out of a window well formed by a vehicle body structure inner and outer panel, comprising:
   an elongated integrally formed elastomeric member having a conduit portion, a channel portion and a flange portion,
   fastening means securing said flange portion subjacent the upper edge of said outer panel,
   said flange portion being creased adjacent its juncture with the conduit and channel portions to provide a hinge bend line,
   said conduit portion having a plurality of fluid spray apertures along its length,
   a wiper blade means carried in said channel portion,
   positioning means responsive to movement of the window for swinging the conduit and wiper blade means carrying channel portions about the hinge bend line to direct fluid toward the outer surface of the window when the latter is moved in one direction and to engage the wiper blade means with the wetted surface when the window is moved in the opposite direction, and a source of fluid under pressure connected to said conduit portion.

6. A window cleaning unit according to claim 5, in which:

the positioning means comprises a plurality of friction pads secured to the conduit portion of the elastomeric member in an interference relationship to the window as the latter is raised and lowered, said friction pads on the downstroke of the window swinging the conduit and channel portions about the hinge bend line to position the wiper blade means out of contact with the window surface as the fluid is sprayed thereon, said friction pads on the upstroke of the window swinging the conduit and channel portions about the hinge bend line to position the wiper blade means in window squeegee position.

7. A window cleaning unit according to claim 6, in which:

the conduit portion having the spray apertures is located above the channel portion carrying the wiper blade means.

References Cited
UNITED STATES PATENTS

| | | | |
|---|---|---|---|
| 1,924,922 | 8/1933 | Gehrig | 15—250.1 |
| 2,743,472 | 5/1956 | Alef | 15—250.1 |
| 3,452,384 | 7/1969 | Scinta | 15—250.1 |

ROBERT W. MICHELL, Primary Examiner

U.S. Cl. X.R.

15—250.1